(12) United States Patent
Oh et al.

(10) Patent No.: US 10,808,651 B2
(45) Date of Patent: Oct. 20, 2020

(54) ENGINE SYSTEM (71) Applicants: Hyundai Motor Company, Seoul (KR); Kia Motors Corporation, Seoul (KR)

(72) Inventors: Heechang Oh, Gyeonggi-do (KR); Yeongseop Park, Seoul (KR); Kwanhee Lee, Gyeonggi-do (KR); Jonghyeok Lee, Gyeonggi-do (KR); Jaegu Kang, Seoul (KR); Dong Hee Han, Seoul (KR); Seungwoo Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/519,589

(22) Filed: Jul. 23, 2019

(65) Prior Publication Data
US 2020/0240371 A1    Jul. 30, 2020

(30) Foreign Application Priority Data

Jan. 29, 2019  (KR) .................... 10-2019-0011326

(51) Int. Cl.
| F02B 47/08 | (2006.01) |
| F02M 26/33 | (2016.01) |
| F02D 41/00 | (2006.01) |
| F02B 39/10 | (2006.01) |
| F02B 37/16 | (2006.01) |

(52) U.S. Cl.
CPC ............. *F02M 26/33* (2016.02); *F02B 37/16* (2013.01); *F02B 39/10* (2013.01); *F02D 41/0007* (2013.01)

(58) Field of Classification Search
CPC ........ F02M 26/07; F02M 26/08; F02M 26/23; F02B 37/10
USPC ............. 123/568.11, 568.12, 568.21, 568.26
See application file for complete search history.

(56) References Cited

U.S. PATENT DOCUMENTS

| 2001/0035171 | A1* | 11/2001 | Kim ...................... F02B 37/10 |
| | | | 123/568.12 |
| 2014/0060503 | A1* | 3/2014 | Zhu ....................... F02M 26/23 |
| | | | 123/568.12 |
| 2016/0333827 | A1* | 11/2016 | Smiljanovski ......... F02M 26/05 |
| 2020/0182202 | A1* | 6/2020 | Hong ................... F02M 35/104 |

* cited by examiner

*Primary Examiner* — John Kwon
(74) *Attorney, Agent, or Firm* — Mintz Levin Cohn Ferris Glovsky and Popeo, P.C.; Peter F. Corless (57) ABSTRACT

An engine system includes an engine with a combustion chamber, an intake line in which external air flows, and an exhaust line in which exhaust gas flows. A compressor is disposed in the intake line and rotated with a turbine to compress external air. A first recirculation line is branched off from the exhaust line and merged into the intake line. An EGR cooler cools exhaust gas flowing through the first recirculation line. A second recirculation line is branched off from the first recirculation line. A bypass line is branched off from the first recirculation line between an electric supercharger and the EGR cooler. A three-way valve is disposed where the bypass and first recirculation lines join. An intake valve is disposed in the intake line between where the first recirculation line and intake valve join and where the bypass line and intake valve join.

12 Claims, 6 Drawing Sheets

ENGINE SYSTEM

CROSS-REFERENCE TO RELATED APPLICATION

This application claims priority to and the benefit of Korean Patent Application No. 10-2019-0011326 filed in the Korean Intellectual Property Office on Jan. 29, 2019, the entire contents of which are incorporated herein by reference.

BACKGROUND

(a) Field of the Invention

The present invention relates to an engine system, and more particularly, to an engine system that recirculates exhaust gas in all driving regions and maintains an engine torque without using rich air-fuel ratio in a high-speed and high-load region.

(b) Description of the Related Art

An engine appropriately mixes air and fuel and generates driving power by burning the mixed gas. To obtain required output power and combustion efficiency, sufficient air needs to be supplied to the engine. Accordingly, a turbocharger is used to increase combustion efficiency and supply sufficient air to the engine. On the other hand, an exhaust gas recirculation (EGR) system is mounted on an engine for reducing harmful exhaust gas and improving fuel efficiency.

The EGR system introduces a portion of the exhaust gas (e.g., about 5-20%) discharged from the engine into the combustion chamber with fresh air, so that the pressure becomes greater than when only fresh air is supplied to the combustion chamber, and thus pumping loss may be reduced. In addition, it may be possible to reduce the occurrence of knocking which adversely affects the efficiency and performance of the gasoline engine by reducing the reactivity of air/fuel mixture.

A low-pressure EGR apparatus (LP-EGR apparatus) may be used to apply the EGR system to an engine equipped with a turbocharger. The LP-EGR apparatus the exhaust gas passing through a turbine of a turbocharger and a three-way catalyst to an intake line at an upstream of the compressor of the turbocharger. Therefore, the flow of the exhaust gas recirculated in the LP-EGR apparatus is generated using the difference of exhaust gas pressure at a downstream side of the catalyst and air pressure at an upstream side of the compressor.

However, in a load-load region of the engine in which the pressure of the exhaust gas at a downstream of the catalyst is similar to the atmospheric pressure, the differential pressure between an upstream side of an EGR valve and a downstream side of the EGR valve is minimal. Therefore, when the engine is operating in a low load region, it may be difficult to supply the exhaust gas to the engine. Meanwhile, when the amount of fuel is increased beyond a theoretical air-fuel ratio, the utilization of air may increase and the reactivity of the air/fuel mixture may be decreased. Therefore, the knocking of the engine is reduced and the engine torque may be increased.

Recently, to increase the maximum torque of the engine under the condition of a wide open throttle (WOT), a strategy of burning at a richer air-fuel ratio than the theoretical air-fuel ratio is applied to a gasoline engine. In addition, when burning at a rich air-fuel ratio, the temperature of the adiabatic flame is reduced, and thus, the temperature of the exhaust gas may be reduced while maintaining the torque of the engine. Therefore, the strategy of burning at a richer air-fuel ratio than the theoretical air-fuel ratio is used to reduce the exhaust temperature to prevent breakage of the catalyst, turbine, an intake manifold and an exhaust manifold due to high heat exhaust gas in high-speed and high-load region.

However, if the fuel is burned at a rich air-fuel ratio, the fuel efficiency may be deteriorated and the emission of incomplete combustion products such as unburned hydrocarbons and carbon monoxide may increase. Therefore, regulations for the combustion of rich air-fuel ratio are being developed for reducing air pollution caused by exhaust gas. If the theoretical air-fuel ratio combustion is applied in all driving regions without using rich air-fuel ratio combustion in the above conditions, output and torque of the engine may be lost.

The above information disclosed in this section is merely for enhancement of understanding of the background of the invention and therefore it may contain information that does not form the prior art that is already known in this country to a person of ordinary skill in the art.

SUMMARY

The present invention provides an engine system that recirculates exhaust gas in all driving regions, and maintains an engine torque without using rich air-fuel ratio in a high-speed and high-load region.

An engine system according to an exemplary embodiment of the present invention may include an engine having at least one combustion chamber that generates driving torque by burning air/fuel mixture; an intake line in which external air supplied to the combustion chamber flows; an exhaust line in which exhaust gas exhausted from the combustion chamber of the engine flows; a turbocharger having a turbine disposed in the exhaust line, and a compressor in the intake line and rotated with the turbine to compress external air; a first recirculation line branched off from the exhaust line at downstream portion of the turbine and merged into the intake line; and an EGR cooler disposed in the first recirculation line and configured to cool exhaust gas flowing through the first recirculation line.

Additionally, the engine system may include an electric supercharger disposed in the first recirculation line at downstream portion of the EGR cooler; a second recirculation line branched off from the first recirculation line between the EGR cooler and the electric supercharger and merged into the first recirculation line at an upstream portion of the electric supercharger; a bypass line branched off from the first recirculation line between the electric supercharger and the EGR cooler and merged into the intake line; a three-way valve disposed in a portion where the bypass line and the first recirculation line are joined; and an intake valve disposed in the intake line between a portion where the first recirculation line and the intake valve are joined and a portion where the bypass line and the intake valve are joined.

The engine system may further include a controller configured to operate the intake valve, the EGR valve, the three-way valve and the electric supercharger based on an engine speed and an engine load. In a low-speed and high-load region, the controller may be configured to close the intake valve, open the EGR valve, operate the three-way valve to join the first recirculation line between a portion where the intake line and the first recirculation line and provide fluid communication between a portion where the first recirculation line and the bypass line are joined and the bypass line, and operate the electric supercharger in a forward direction.

A recirculation gas flowing through the second recirculation line and the external air flowing into the first recirculation line from the intake line may be compressed by the electric supercharger and supplied to the combustion chamber passing through the bypass line the intake line. In a low-speed and middle-load region, the controller may be configured to open the intake valve, open the EGR valve, operate the three-way valve to prevent fluid communication between the first recirculation line and the bypass line, and stop operation of the electric supercharger.

The external air flowing through the intake line and the recirculation gas flowing through the first recirculation line and the second recirculation line may be compressed by the compressor and supplied to the combustion chamber. In a low-speed and low-load region, the controller may be configured to open the intake valve, close the EGR valve, operate the three-way valve to provide fluid communication between the first recirculation line between a portion where the exhaust line and the first recirculation line are joined a portion where the intake line and the first recirculation line are joined, and to prevent fluid communication between the first recirculation line and the bypass line, and operate the electric supercharger in a reverse direction. The external air flowing through the intake line and the recirculation gas flowing through the first recirculation line may be supplied to the combustion chamber through the compressor.

An engine system according to another exemplary embodiment of the present invention may include an engine having at least one combustion chamber that generates driving torque by burning air/fuel mixture; an intake line in which external air supplied to the combustion chamber flows; an exhaust line in which exhaust gas exhausted from the combustion chamber of the engine flows; a turbocharger having a turbine disposed in the exhaust line, and a compressor disposed in the intake line and rotated with the turbine to compress external air; a warming-up catalytic converter (WCC) disposed in the exhaust line at a downstream portion of the turbine; an under-floor catalytic converter (UCC) disposed in the exhaust line at a downstream portion of the WCC; and a first recirculation line branched off from the exhaust line between the WCC and the UCC and merged into the intake line.

The engine system may further include an EGR cooler disposed in the first recirculation line and configured to cool exhaust gas flowing through the first recirculation line; an electric supercharger disposed in the first recirculation line at downstream portion of the EGR cooler and configured to compress recirculation gas or external air flowing through the first recirculation line; a second recirculation line branched off from the first recirculation line between the EGR cooler and the electric supercharger and merged into the first recirculation line at an upstream portion of the electric supercharger; a bypass line branched off from the first recirculation line between the electric supercharger and the EGR cooler and merged into the intake line; a three-way valve disposed in a portion where the bypass line and the first recirculation line are joined; and an intake valve disposed in the intake line between a portion where the first recirculation line and the intake valve are joined and a portion where the bypass line and the intake valve are joined.

The engine system may include a controller configured to operate the intake valve, the EGR valve, the three-way valve and the electric supercharger based on an engine speed and an engine load. In a middle-speed and high-load region and a high-speed and high-load region, the controller may be configured to open the intake valve, close the EGR valve, operate the three-way valve to provide fluid communication between the first recirculation line between a portion where the exhaust line and the first recirculation line are joined and a portion where the intake line and the first recirculation line are joined, and to prevent fluid communication between the first recirculation line and the bypass line, and operate the electric supercharger in a forward direction.

Some external air flowing into the intake line may be directly supplied to the compressor, and remained external air flows backward to the first recirculation line and is supplied to the UCC. According to an exemplary embodiment of the present invention, it may be possible to expand a region in which exhaust gas may be recirculated to a low-load region using an electric supercharger, and an engine output and fuel consumption may be improved by supplying charged air to the engine in a low-speed and high-load region in which is difficult to supply enough charged air by a turbocharger. Further, in a high-speed and high-load region in which a rich air-fuel ratio combustion strategy is used, some external air (fresh air) flowing through an intake line may be supplied to a catalytic converter to purify incomplete combustion products of exhaust gas.

BRIEF DESCRIPTION OF THE DRAWINGS

The objects, features and advantages of the present invention will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

Although exemplary embodiment is described as using a plurality of units to perform the exemplary process, it is understood that the exemplary processes may also be performed by one or plurality of modules. Additionally, it is understood that one or more of the below methods, or aspects thereof, may be executed by at least one controller. The term "controller" or "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present invention may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Figure 1:
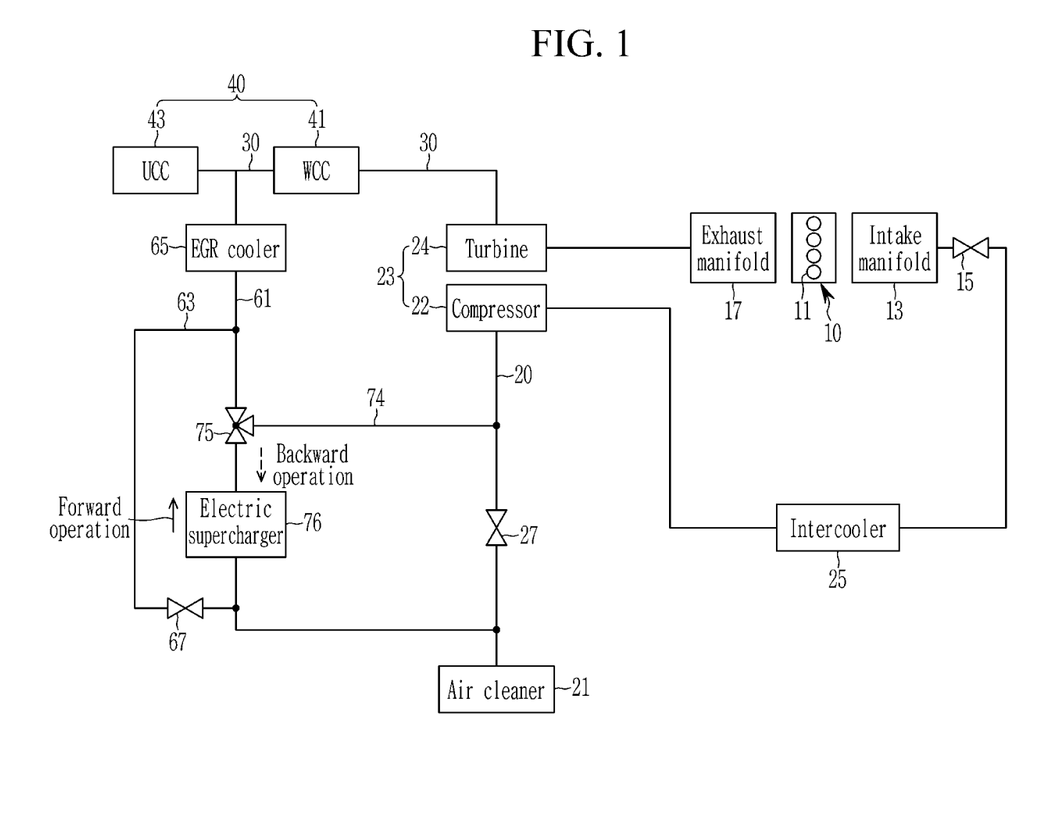
FIG. 1 shows a schematic view of an engine system according to an exemplary embodiment of the present invention.

Hereinafter, an engine system according to an exemplary embodiment of the present invention will be described in detail with reference to accompanying drawings. FIG. 1 shows a schematic view of an engine system according to an exemplary embodiment of the present invention. As shown in FIG. 1, an engine system according to an exemplary embodiment of the present invention may include an engine 10, an intake line 20, an exhaust line 30 and an exhaust gas recirculation apparatus (EGR apparatus).

The engine 10 burns air/fuel mixture in which fuel and air are mixed to convert chemical energy into mechanical energy. The engine 10 may include a plurality of combustion chambers 11, an intake manifolds 13, a throttle valves 15 and an exhaust manifolds 17. The combustion chambers 11 generate driving torque by burning fuel.

Although the drawings illustrate that the engine 10 includes four combustion chambers 21, the number of the combustion chambers 21 is not limited thereto. The intake manifold 13 distributes air into the combustion chambers 11. The throttle valve 15 is disposed in the intake manifold 13. Air amount supplied to the intake manifold 13 is adjusted by the throttle valve 15.

Particularly, the exhaust manifold 17 may be connected with the combustion chamber 11. Exhaust gas exhausted from the combustion chamber 11 may be exhausted through the exhaust manifold 17. The engine 10 may be a gasoline direct injection (GDL) engine that directly injects fuel into the gasoline engine, but not limited thereto. The intake line 20 may be connected with the intake manifold 13 and the exhaust gas recirculation apparatus 50. An air cleaner 21, an intake valve 27, a compressor 22 of a turbocharger 23 and an intercooler 25 may be sequentially disposed in the intake line 20. The air cleaner 21 may be configured to filter external air flowing into intake line 20.

The compressor 22 of the turbocharger 23 may be disposed in the intake line 20 at downstream portion of the air cleaner 21. The compressor 22 may be cooperatively rotated with a turbine 24, and may be configured to compress external air and/or recirculation gas flowing through the intake line 20. The intercooler 25 may be disposed in the intake line 20 at a downstream portion of the compressor 22. The intercooler 25 may be configured to cool external air and/or recirculation gas flowing through the intake line 20.

The intake valve 27 may be disposed in the intake line 20 between the compressor 22 and the air cleaner 21. Flow of external air and/or recirculation gas through the intake line 20 may be adjusted by the intake valve 27. The turbine 24 of the turbocharger 23 and a catalytic converter 40 may be disposed in the exhaust line 30. The turbine 24 may be rotated by exhaust gas exhausted from the combustion chamber 11.

Additionally, the catalytic converter 40 may be disposed in the exhaust line 30 at a downstream portion of the turbine 24. The catalytic converter 40 may include a warming-up catalytic converter (WCC) 41 and an under-floor catalytic converter (UCC) 43. The catalytic converter 40 may be configured to purify harmful material included in exhaust gas exhausted from the combustion chamber 11. Exhaust gas flowing through the exhaust line 30 may be purified by the WCC 41, and supplied to the UCC 43. The UCC 43 may be disposed in the exhaust line 30 at a downstream portion of the WCC 41.

Further, the exhaust gas recirculation apparatus 60 may include a first recirculation line 61, a second recirculation line 63, a bypass line 74, a three-way valve 75, an electric supercharger 76, an EGR cooler 65 and an EGR valve 67. The exhaust gas recirculation apparatus 60 may be a low-pressure EGR apparatus (LP-EGR apparatus), but is not limited thereto. The exhaust gas recirculation apparatus 60 and electric supercharger 76 will be described in detail. The first recirculation line 61 may be branched off from the exhaust line 30 at a downstream portion of the turbine 24, and merged into the intake line 20 at a downstream portion of the air cleaner 21. Preferably, the first recirculation line 61 may be branched off from the exhaust line 30 between the WCC 41 and the UCC 43.

Some exhaust gas flowing through the exhaust line 30 may flow into the first recirculation line 61. Hereinafter, exhaust gas flowing into the first recirculation line 61 will be referred to as a recirculation gas (or EGR gas). The recirculation gas may flow into the second recirculation line 63 through the first recirculation line 61. Additionally, some of external air flowing through the may be supplied to the UCC 43 by reversely flowing through the first recirculation line 61. The EGR cooler 65 may be configured to cool recirculation gas or external air flowing into the first recirculation line 61.

The electric supercharger 76 may be disposed in the first recirculation line at a downstream portion of the EGR cooler 65. The electric supercharger 76 may be configured to compress recirculation gas and/or external air flowing through the first recirculation line. The electric supercharger 76 may include a motor and an electric compressor. The second recirculation line 63 may be branched off from the first recirculation line at a downstream portion of the EGR cooler 65 and merged into the first recirculation line at an upstream portion of the electric supercharger 76. The EGR valve 67 may be disposed in the second recirculation line 63, and recirculation gas amount may be adjusted by the EGR valve 67.

The bypass line 74 may be branched off from the first recirculation line 61 between the EGR cooler 65 and the electric supercharger 76, and merged into the intake line 20 between the intake valve 27 and the compressor 22. The three-way valve 75 may be disposed at a portion where the first recirculation line 61 and the bypass line 74 are joined.

By the operation of the three-way valve 75, the first recirculation line 61 between a portion where the intake line 20 and the first recirculation line 61 may be joined and a portion where the first recirculation line 61 and the bypass line 74 may be joined and the bypass line 74 may be in fluid communication with the first recirculation line 61. Accordingly, when the first recirculation line 61 and the bypass line are in communication, external air supplied from the intake line 20 may reversely flow through the first recirculation line and the bypass line 74 (refer to FIG. 3). Further, by the operation of the three-way valve 75, the first recirculation line 61 and the bypass line 74 blocked from communication.

Figure 4:
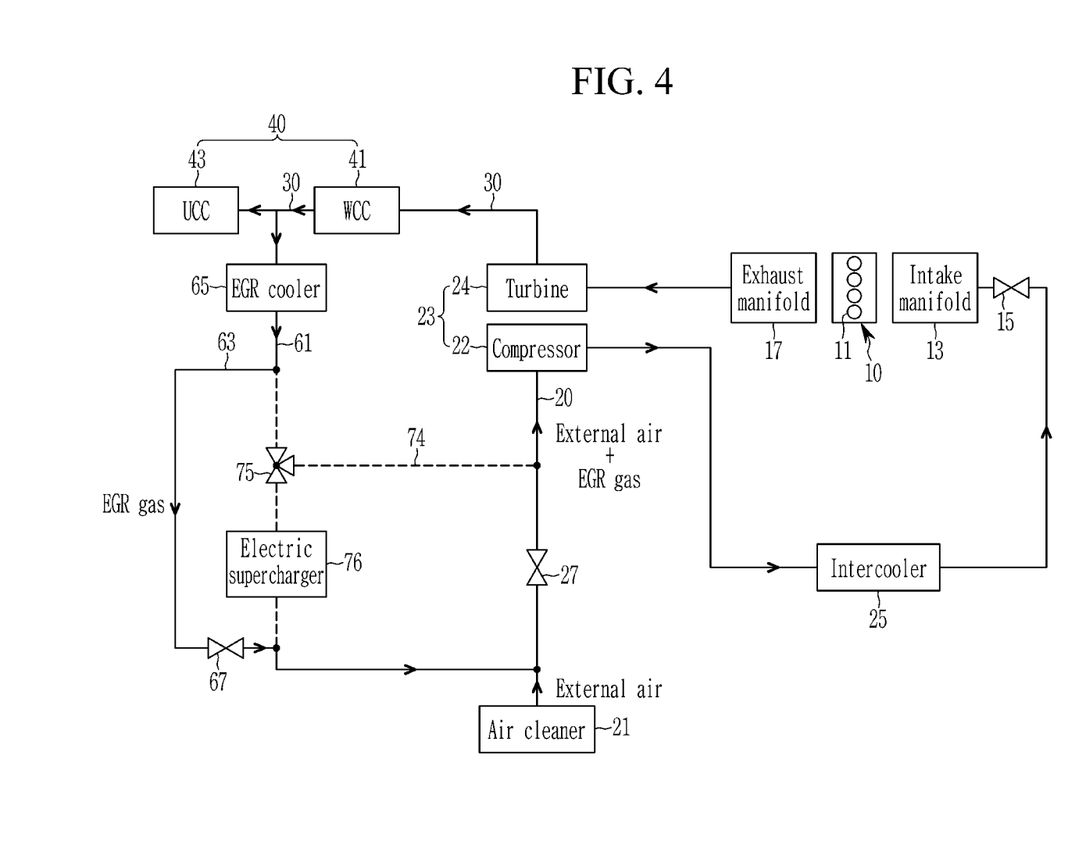
FIG. 4 shows a schematic view of an engine system according to an exemplary embodiment of the present invention in a low-speed and middle-load region.
Figure 5:
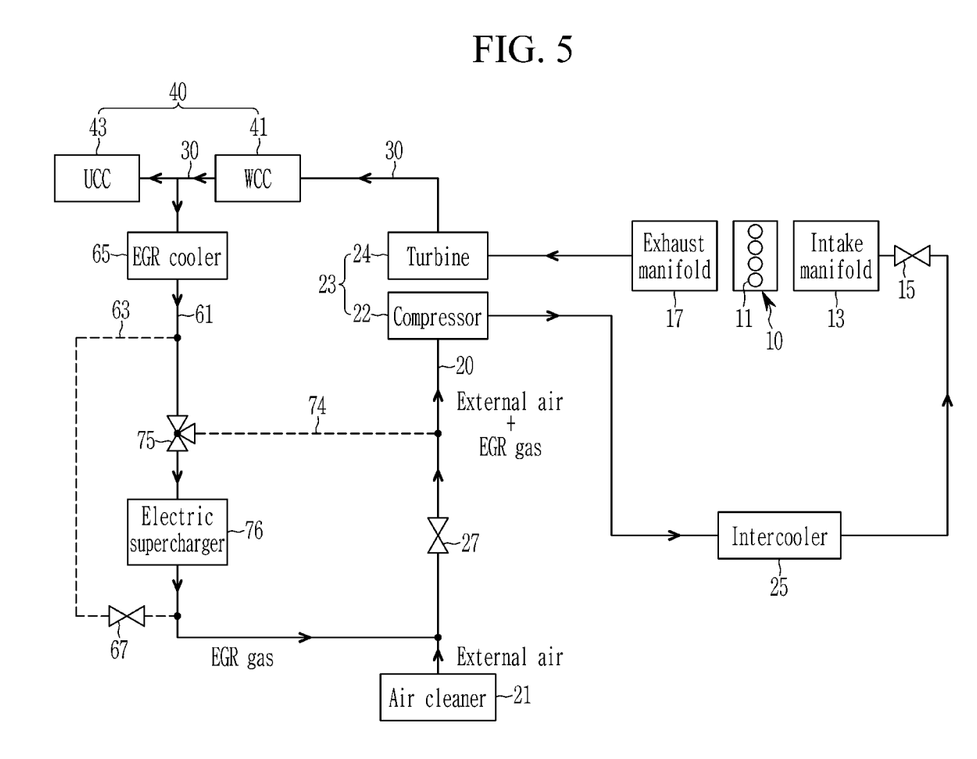
FIG. 5 shows a schematic view of an engine system according to an exemplary embodiment of the present invention in a low-speed and low-load region.

When the first recirculation line 61 and the bypass line 74 are blocked from communication, recirculation gas and/or external air may flow through the first recirculation line 61 and not into the bypass line (refer to FIG. 4 to FIG. 5). Further, by the operation of the three-way valve 75, the first recirculation line 61 between a portion where the exhaust line 30 and the first recirculation line 61 may be joined and a portion where the intake line 20 and the first recirculation line 61 are joined may be in fluid communication, and the first recirculation line 61 and the bypass line 74 may be blocked from communication. The three-way valve 75 may be operated by a control signal of a controller.

The electric supercharger 76 may be configured to compress recirculation gas flowing through the first recirculation line 61 and external air reversely flowing through the first recirculation line 61, and the compressed recirculation gas and external air may be supplied to the combustion chamber 11 of the engine 10. The electric supercharger 76 may be operated as a pump, and external air reversely flowing through the first recirculation line 61 may be supplied to the UCC 43 as necessary.

In the specification of the present invention, an operation of the electric supercharger that compresses a fluid (e.g., recirculation gas and/or external air) flowing from a portion where the intake line 20 and the first recirculation line 61 are joined to a portion where the first recirculation line 61 and the bypass line 74 are joined will be referred to as a forward operation of the electric supercharger (refer to solid line arrow of FIG. 1). Further, an operation of the electric supercharger that compresses a fluid (e.g., recirculation gas and/or external air) flowing from a portion where the exhaust line 30 and the first recirculation line 61 are joined to a portion where the first recirculation line 61 and the intake line 20 are joined will be referred to as a backward operation of the electric supercharger (refer to dashed line arrow of FIG. 1).

Figure 2:
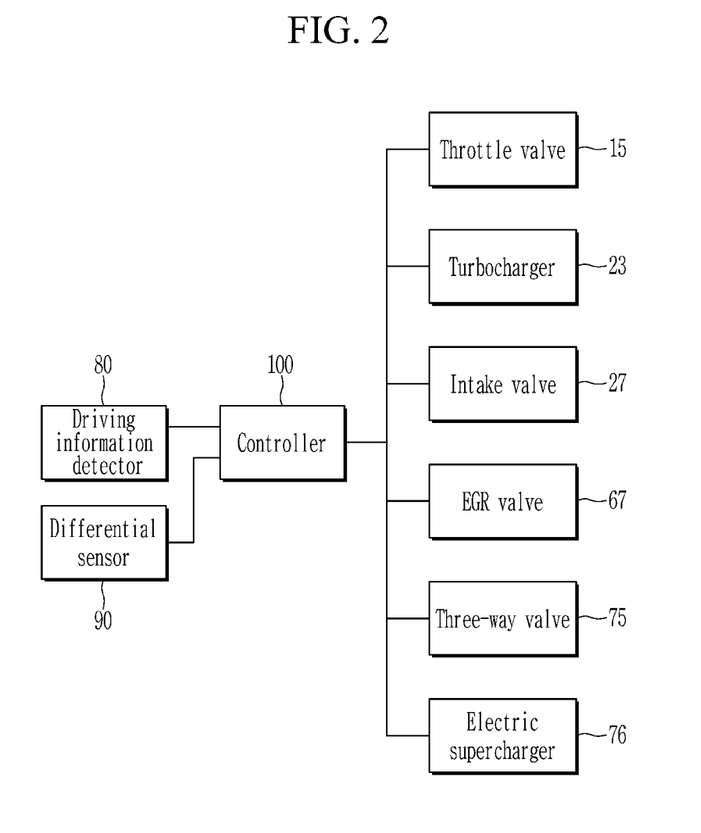
FIG. 2 shows a block diagram of an engine system according to an exemplary embodiment of the present invention.

Referring to FIG. 2, the engine system according to an exemplary embodiment of the present invention may further include a driving information detector 80, a differential pressure sensor 90 and a controller 100. The driving information detector 80 may be a sensor and may be configured to detect an engine speed and an engine load, and the detected engine speed and engine load may be transmitted to the controller 100. The differential pressure sensor 90 may be configured to detect a differential pressure of a pressure in the intake line between the air cleaner 21 and the intake valve 27 and a pressure in the first recirculation line 61. The differential pressure detected by the differential pressure sensor 90 may be transmitted to the controller 100. The controller 100 may be configured to determine a driving region of the engine 10 based on the engine speed and the engine load.

In particular, the driving region may be divided into a low-speed and low-load region, a low-speed and middle-load region, a low-speed and high-load region, a middle-speed and middle-load region, a middle-speed and middle-load region, a middle-speed and high-load region, a high-speed and low-load region, a high-speed and middle-load region and a high-speed and high-load region.

The controller 100 may be configured to operate the intake valve 27, the EGR valve 67, the three-way valve 75 and the electric supercharger 76 based on the engine speed and the engine load. Further, the controller 100 may be configured to operate the turbocharger 23. The controller 100 may be provided as at least one processor operating by a predetermined program, and the predetermined program performs each step of a method of operating the engine system according to an exemplary embodiment of the present invention.

Hereinafter, an operation of the engine system according to an exemplary embodiment of the present invention will described in detain with reference to accompanying drawings. FIG. 4 shows a schematic view of an engine system according to an exemplary embodiment of the present invention in a low-speed and middle-load region.

Figure 3:
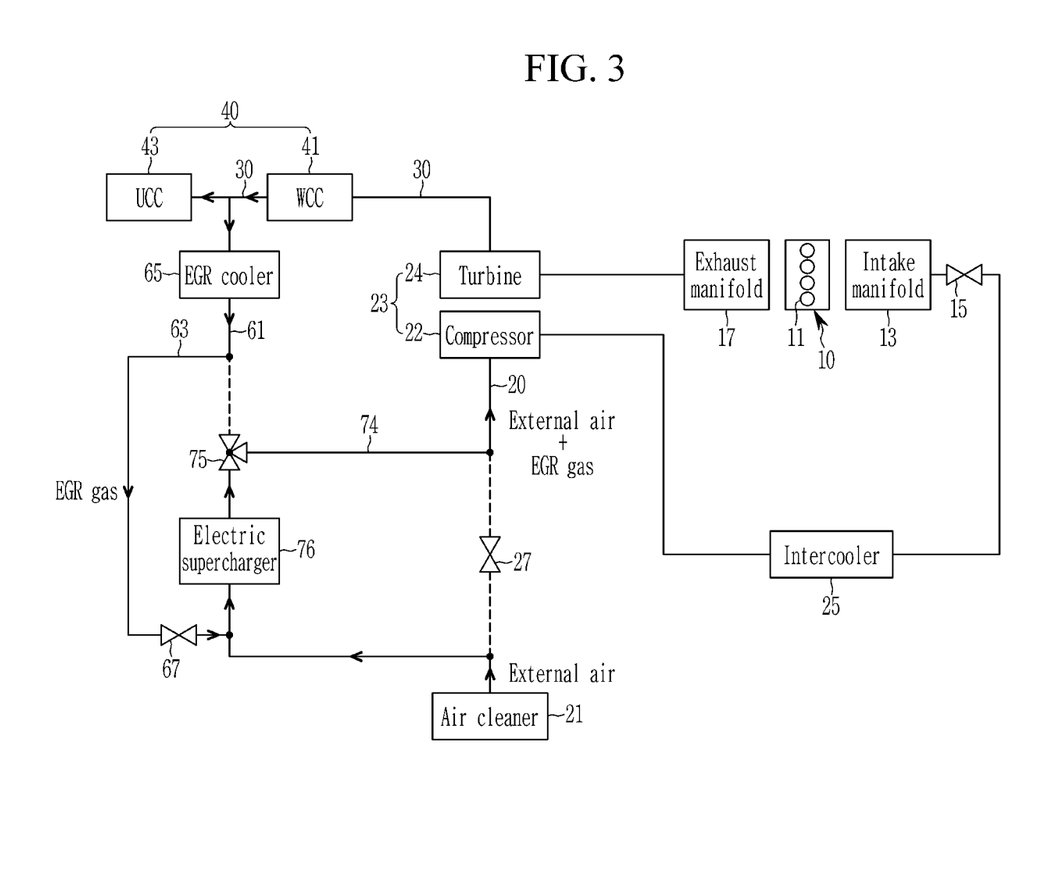
FIG. 3 shows a schematic view of an engine system according to an exemplary embodiment of the present invention in a low-speed and high-load region.

When the driving region of the engine is a low-speed and high-load region, the controller 100 may be configured to close the intake valve 27 and open the EGR valve 67. Simultaneously, the controller 100 may be configured to operate the three-way valve 75 to join the first recirculation line 61 between a portion where the intake line 20 and the first recirculation line 61 and provide fluid communication between a portion where the first recirculation line and the bypass line 74 are joined the bypass line 74.

When the intake valve 27 is closed, external air and/or recirculation gas do not flow through the intake line 20 between a portion where the intake line 20 and the first recirculation line 61 are joined and a portion where the intake line 20 and the bypass line 29 are joined. Therefore, external air flowing through the air cleaner 21 reversely flows through the first recirculation line 61 and may be compressed by a forward operation of the electric supercharger 76. When the EGR valve 67 is opened, recirculation gas flowing into the first recirculation line from the exhaust line 30 flows through the second recirculation line 63, and may be compressed by a forward operation of the electric supercharger 76.

Simultaneously, since the first recirculation line 61 between a portion where the intake line 20 and the first recirculation line 61 are joined and a portion where the first recirculation line and the bypass line 74 are joined and the bypass line 74 by the three-way valve 75, external air and recirculation gas compressed by the electric supercharger 76 may be supplied to the combustion chamber 11 through the bypass line 74 and the intake line at a downstream portion of the intake valve 27.

In the low-speed and high-load regions, the amount of exhaust gas discharged from the combustion chamber 11 is insufficient, and therefore, difficult to compress external air by the turbocharger 23. Accordingly, the compressed air may be supplied to the combustion chamber 11 through the forward operation of the electric supercharger in the low-speed high-load region, and thus, sufficient engine torque may be output. Additionally, the fuel consumption of the engine 10 may be improved since the reactivity of air/fuel mixer in the combustion chamber 11 may be increased and knocking may be suppressed through the supply of recirculation gas.

FIG. 4 shows a schematic view of an engine system according to an exemplary embodiment of the present invention in a low-speed and middle-load region. When the driving region of the engine 10 is a low-speed and middle-load region, the controller 100 may be configured to open the intake valve 27 and open the EGR valve 67. Simultaneously, the controller 100 may be configured to operate the three-way valve 75 to block communication between the first recirculation line 61 and the bypass line 74, and stop operation of the electric supercharger 76.

Since the intake valve 27 is opened, the intake line 20 between a portion where the first recirculation line 61 and the intake line 20 are joined and a portion where the bypass line 74 and the intake line 20, and external air flowing from the air cleaner 21 may be directly supplied to the combustion chamber 11 through the compressor 22 of the turbocharger 23. Further, since the EGR valve 67 is opened and the first recirculation line 61 and the bypass line 74 are not in communication with each other by an operation of the three-way valve 75, recirculation gas flowing through the first recirculation line 61 from the exhaust line 30 may be supplied to the intake line 20 through the second recirculation line 63.

Then the recirculation gas may be supplied to the combustion chamber 11 after compressed by the compressor 22 of the turbocharger 23. As described above, since recirculation gas may be supplied to the combustion chamber in the low-speed and middle-load region, the reactivity of air/fuel mixer in the combustion chamber 11 may be increased and knocking may be suppressed. Therefore, the fuel consumption of the engine 10 may be improved.

FIG. 5 shows a schematic view of an engine system according to an exemplary embodiment of the present invention in a low-speed and low-load region. When the driving region of the engine 10 is a low-speed and low-load region, the controller 100 may be configured to open the intake valve 27 and close the EGR valve 67. Additionally, the controller 100 may be configured to operate the three-way valve 75 to provide communication between the first recirculation line 61 between a portion where the exhaust line 30 and the first recirculation line 61 are joined and a portion where the intake line 20 and the first recirculation line 61 are joined, and block communication between the first recirculation line 61 and the bypass line 74. Simultaneously, the controller 100 may be configured to operate the electric supercharger as a backward operation.

Since the intake valve 27 is opened, external air may flow through the intake line 20 between a portion where the first recirculation line 61 and the intake line 20 are joined and a portion where the bypass line 74 and the intake line 20 are joined. Therefore, external air flowing from the air cleaner 21 may be directly supplied to the combustion chamber 11 through the compressor 22 of the turbocharger 23. Further, since the EGR valve 67 is closed, and the first recirculation line 61 between a portion where the exhaust line 30 and the first recirculation line 61 are joined and a portion where the intake line 20 and the first recirculation line 61 are joined, recirculation gas flowing from the exhaust line 30 may flow only through the first recirculation line 61 and may be prevented from flowing through the second recirculation line 63. Since the first recirculation line 61 and the bypass line 74 are not in communication, recirculation gas is prevented from flowing through the bypass line 74. Therefore, recirculation gas may be supplied to the intake line 20 by the electric supercharger 76 operated as a pump.

In the low-speed and low-load regions, the pressure of the recirculation gas is less than the pressure of the external air flowing through the intake line 20, and thus, circulation of recirculation gas through the recirculation line may not be smooth. Therefore, by operating the electric supercharger 76 installed in the first recirculation line 61 in the reverse direction, the recirculation gas may be supplied more smoothly to the combustion chamber 11 through the first recirculation line 61 to improve the fuel consumption of the engine.

Figure 6:
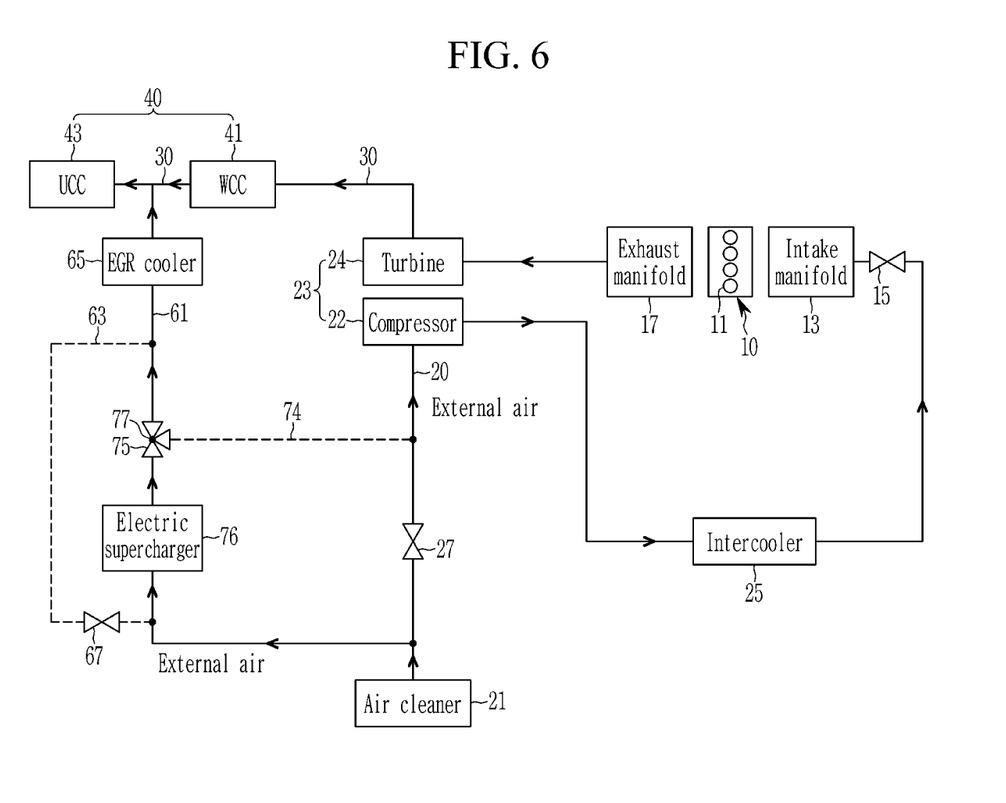
FIG. 6 shows a schematic view of an engine system according to an exemplary embodiment of the present invention in a middle-speed and high-load region and a high-speed and high-load region.

FIG. 6 shows a schematic view of an engine system according to an exemplary embodiment of the present invention in a middle-speed and high-load region and a high-speed and high-load region. Referring to FIG. 6, when the driving region of the engine 10 is a middle-speed and high-load region and a high-speed and high-load region, the controller 100 may be configured to open the intake valve 27 and close the EGR valve 67.

Additionally, the controller 100 may be configured to operate the three-way valve 75 to provide communication between the first recirculation line 61 between a portion where the exhaust line 30 and the first recirculation line 61 are joined and a portion where the intake line 20 and the first recirculation line 61 are joined, and to block communication between the first recirculation line 61 and the bypass line 74. Simultaneously, the controller 100 may be configured to operate the electric supercharger as a forward operation.

Since the intake valve 27 is opened, external air may flow through the intake line 20 between a portion where the first recirculation line 61 and the intake line 20 are joined and a portion where the bypass line 74 and the intake line 20 are joined. Therefore, external air flowing from the air cleaner 21 may be directly supplied to the combustion chamber 11 through the compressor 22 of the turbocharger 23.

Further, in this case, the EGR valve is closed, the first recirculation line 61 between a portion where the exhaust line 30 and the first recirculation line 61 are joined and a portion where the intake line 20 and the first recirculation line 61 are joined are in communication, and the electric supercharger may be operated as a forward operation. Therefore, exhaust gas may be prevented from flowing into the first recirculation line 61 and the second recirculation line 53, and some external air flowing through the air cleaner 21 may reversely flow through the first recirculation line, and may be supplied to the UCC 43.

In the middle-speed and high-load region and the high-speed and high-load region, the exhaust gas discharged from the combustion chamber 11 due to the rich air-fuel ratio may contain a substantial amount of incomplete combustion products. Therefore, when some external air is supplied to the UCC 43 through the first recirculation line 61, sufficient oxygen may be supplied to oxidize the incomplete combusted product of a three-way catalyst of the UCC 43, and the incomplete combusted product may be converted into harmless components and exhausted to the outside of the vehicle.

DESCRIPTION OF SYMBOLS

10: engine
11: combustion chamber
13: intake manifold
15: throttle valve
17: exhaust manifold
20: intake line
21: air cleaner
22: compressor
23: turbocharger
24: turbine
25: intercooler
27: intake valve
30: exhaust line
40: catalytic converter
41: WCC
43: UCC
60: exhaust gas recirculation apparatus
61: first recirculation line
63: second recirculation line
65: EGR cooler
67: EGR valve
75: three-way valve
76: electric supercharger
80: driving information detector
90: differential pressure sensor
100: controller While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. An engine system, comprising:
    an engine having at least one combustion chamber that generates driving torque by burning air/fuel mixture;
    an intake line in which external air supplied to the combustion chamber flows;
    an exhaust line in which exhaust gas exhausted from the combustion chamber of the engine flows;
    a turbocharger having a turbine disposed in the exhaust line, and a compressor disposed in the intake line and rotated with the turbine to compress external air;
    a first recirculation line branched off from the exhaust line at downstream portion of the turbine and merged into the intake line;
    an exhaust gas recirculation (EGR) cooler disposed in the first recirculation line and configured to cool exhaust gas flowing through the first recirculation line;
    an electric supercharger disposed in the first recirculation line at downstream portion of the EGR cooler;
    a second recirculation line branched off from the first recirculation line between the EGR cooler and the electric supercharger and merged into the first recirculation line at an upstream portion of the electric supercharger;
    a bypass line branched off from the first recirculation line between the electric supercharger and the EGR cooler and merged into the intake line;
    a three-way valve disposed in a portion where the bypass line and the first recirculation line are joined; and
    an intake valve disposed in the intake line between a portion where the first recirculation line and the intake valve are joined and a portion where the bypass line and the intake valve are joined.

2. The engine system of claim 1, further comprising:
    a controller configured to operate the intake valve, the EGR valve, the three-way valve and the electric supercharger based on an engine speed and an engine load.

3. The engine system of claim 2, wherein: in a low-speed and high-load region, the controller is configured to:
    close the intake valve;
    open the EGR valve;
    operate the three-way valve to provide fluid communication between the first recirculation line between a portion where the intake line and the first recirculation line are joined and a portion where the first recirculation line and the bypass line are joined and the bypass line; and
    operate the electric supercharger in a forward direction.

4. The engine system of claim 3, wherein a recirculation gas flowing through the second recirculation line and the external air flowing into the first recirculation line from the intake line are compressed by the electric supercharger and supplied to the combustion chamber passing through the bypass line the intake line.

5. The engine system of claim 2, wherein in a low-speed and middle-load region, the controller is configured to:
    open the intake valve;
    open the EGR valve;
    operate the three-way valve to block communication between the first recirculation line and the bypass line; and
    stop operation of the electric supercharger.

6. The engine system of claim 5, wherein the external air flowing through the intake line and the recirculation gas flowing through the first recirculation line and the second recirculation line are compressed by the compressor and supplied to the combustion chamber.

7. The engine system of claim 2, wherein in a low-speed and low-load region, the controller is configured to:
    open the intake valve;
    close the EGR valve;
    operate the three-way valve to provide fluid communication between the first recirculation line between a portion where the exhaust line and the first recirculation line are joined a portion where the intake line and the first recirculation line are joined, and block communication between the first recirculation line and the bypass line; and
    operate the electric supercharger in a reverse direction.

8. The engine system of claim 7, wherein the external air flowing through the intake line and the recirculation gas flowing through the first recirculation line are supplied to the combustion chamber through the compressor.

9. An engine system, comprising:
    an engine having at least one combustion chamber that generates driving torque by burning air/fuel mixture;
    an intake line in which external air supplied to the combustion chamber flows;
    an exhaust line in which exhaust gas exhausted from the combustion chamber of the engine flows;
    a turbocharger having a turbine disposed in the exhaust line, and a compressor disposed in the intake line and rotated with the turbine to compress external air;

a warming-up catalytic converter (WCC) disposed in the exhaust line at a downstream portion of the turbine;

an under-floor catalytic converter (UCC) disposed in the exhaust line at a downstream portion of the WCC;

a first recirculation line branched off from the exhaust line between the WCC and the UCC and merged into the intake line;

an exhaust gas recirculation (EGR) cooler disposed in the first recirculation line and configured to cool exhaust gas flowing through the first recirculation line;

an electric supercharger disposed in the first recirculation line at downstream portion of the EGR cooler and configured to compress recirculation gas or external air flowing through the first recirculation line;

a second recirculation line branched off from the first recirculation line between the EGR cooler and the electric supercharger and merged into the first recirculation line at an upstream portion of the electric supercharger;

a bypass line branched off from the first recirculation line between the electric supercharger and the EGR cooler and merged into the intake line;

a three-way valve disposed in a portion where the bypass line and the first recirculation line are joined; and an intake valve disposed in the intake line between a portion where the first recirculation line and the intake valve are joined and a portion where the bypass line and the intake valve are joined.

10. The engine system of claim 9, further comprising:
a controller configured to operate the intake valve, the EGR valve, the three-way valve and the electric supercharger based on an engine speed and an engine load.

11. The engine system of claim 10, wherein in a middle-speed and high-load region and a high-speed and high-load region, the controller is configured to:
open the intake valve;
close the EGR valve;
operate the three-way valve to provide fluid communication between the first recirculation line between a portion where the exhaust line and the first recirculation line are joined and a portion where the intake line and the first recirculation line are joined, and block communication between the first recirculation line and the bypass line; and
operate the electric supercharger in a forward direction.

12. The engine system of claim 11, wherein some external air flowing into the intake line is directly supplied to the compressor, and a remaining amount of external air flows backward to the first recirculation line and is supplied to the UCC.

* * * * *